(12) United States Patent
Dauder Guardiola (10) Patent No.: US 6,448,511 B1
(45) Date of Patent: Sep. 10, 2002

(54) AUTOMATIC PRODUCT WEIGHING MACHINES, PARTICULARLY FOR FOOD PRODUCTS

(75) Inventor: Agustín Dauder Guardiola, Badalona (ES)

(73) Assignee: Talleres Daumer, S.A. (ES)

( * ) Notice: Subject to any disclaimer, the term of this patent is extended or adjusted under 35 U.S.C. 154(b) by 0 days.

(21) Appl. No.: 09/256,578

(22) Filed: Feb. 24, 1999

(30) Foreign Application Priority Data

Feb. 25, 1998 (ES) ............................................. 9800398

(51) Int. Cl.$^7$ ...................... G01G 13/16; G01G 19/00
(52) U.S. Cl. ...................... 177/103; 177/145; 222/77
(58) Field of Search .................. 177/25.18, 103, 177/119, 145; 222/77

(56) References Cited

U.S. PATENT DOCUMENTS

| | | | | |
|---|---|---|---|---|
| 4,308,928 A | * | 1/1982 | Oshima ................... | 177/25.18 |
| 4,405,023 A | * | 9/1983 | Guardiola ................. | 177/103 |
| 4,413,690 A | * | 11/1983 | Peterson .................. | 177/145 |
| 4,418,772 A | * | 12/1983 | Fukuda ..................... | 177/103 |
| 4,420,051 A | * | 12/1983 | Furuta et al. ............ | 177/145 |
| 4,426,006 A | * | 1/1984 | Horii et al. .............. | 177/145 |
| 4,444,282 A | * | 4/1984 | Kawanishi ............... | 177/25.18 |
| 4,819,749 A | * | 4/1989 | Guardiola ................ | 177/25.18 |
| 5,317,110 A | * | 5/1994 | Dauder Guardiola .... | 177/25.18 |

* cited by examiner

*Primary Examiner*—Randy W. Gibson
(74) *Attorney, Agent, or Firm*—Lackenbach Siegel (57) ABSTRACT

An automatic product weighing machine, for food products having two buckets radially arranged in two concentric paths on a horizontal plane, with frames having an intermediate cross-member, each of which loosely houses a pair of buckets joined to the frame by pairs of flexible, resilient and parallel straps. Two radially aligned weighing apparatuses are respectively arranged below two buckets at the weighing area. Rollers at the free ends of the frames and on two sides of the buckets, stand on respective track sectors, and the buckets are lifted in the sector of the weighing area. Control metering of products to be delivered into buckets comprise of displaceable laminar belts.

18 Claims, 12 Drawing Sheets

AUTOMATIC PRODUCT WEIGHING MACHINES, PARTICULARLY FOR FOOD PRODUCTS

DESCRIPTION

1. Field of the Invention

The invention relates to automatic product weighing machines, particularly for food products, and is also applicable to a range of products, such as fruit, vegetables and the like for instance, and all types and kinds of variously sized items, which are subsequently to be packed with a pre-set total weight and tolerance.

2. Background of the Invention

The inventor/assignee is the holder of U.S. Pat. No. 5,317,110 covering improvements in automatic weighing machines for food products, of the kind comprising a housing for the machine parts, means driving such parts, means feeding the respective products at the machine inlet, commanded by a programming and processing unit, that normally comprise a hopper, a channel and at least an endless belt, the end of which belt leads into an area having receiving buckets flowing beneath it, which buckets are open at the top to receive the products delivered from said end of the endless belt, means for weighing the products contained in each bucket and finding its tare, the buckets having means for unloading the products onto means conveying said products towards the machine outlet, and a programming and processing unit recording the tare of each bucket and the true weight of the products that are collected in each of the buckets as they are weighed, and when the total weight of the products contained in respective buckets reaches a value and tolerance pre-set by the machine user, the programming and processing unit orders the buckets whose product units altogether add up to said total pre-set weight to unload, linking means being provided between said programming and processing unit and the appropriate machine parts, as well as conventional machine command, control and safety means.

These improvements are characterised in that the buckets, lying in a circular and overhanging arrangement, are radially joined by suitable means to a central support turning about a central vertical axis, in that each bucket is joined to the central support by means of two resilient horizontal, parallel and overlying straps which allow the bucket to move up and down, in that the buckets successively pass over a station having a single weighing means, linking up with a programming and processing unit, and in that at least one of the walls of said buckets is mobile, driven by suitable means and commanded by the programming and processing unit to selectively unload each set of product units contained in the respective buckets selected in accordance with the desired total weight, unloading onto means conveying each of said sets of products towards the machine outlet.

The products not selected to be unloaded from the buckets remain contained therein for a new selection in the following cycle.

The strategy of a machine of the type described above is of the kind known as "associative weighing", in which the products pass by weighing means and an electronic calculator seeks a combination yielding a total real value closest to the desired nominal weight, having the pre-set tolerance.

There is however a need in the market for weighing machines capable of simultaneously obtaining sets of products having a different weight or different sizes, and affording a greater production of said sets per unit of time.

SUMMARY OF THE INVENTION

In order to satisfy the market needs, the applicants have devised improvements in automatic product weighing machines of the type of machine subject of U.S. Pat. No. 5,317,110.

The improvements subject of the present invention are applied to automatic product weighing machines, particularly for food products, of the kind comprising a housing for the machine parts, means driving such parts, means feeding the products leading into an area beneath which there is a gradual flow of circularly arranged buckets, having at least a mobile wall and receiving the products delivered, which buckets have respective driving means for unloading the same and are joined to resilient, radial supporting means which are fixed and capable of moving up and down on a support that turns about a central vertical shaft, means for weighing the products contained in the buckets and for obtaining their tare, the buckets having means to selectively unload onto means conveying the products towards the machine outlet, a programming and processing unit that records the tare of every bucket and the true weight of the product or products collected by the buckets and, when the total weight of the products contained in a combination of buckets reaches a value and tolerance pre-set by the machine user, the processing unit orders said buckets to unload through the respective driving means, and means linking said processing unit and the respective machine parts, as well as machine command, control and safety means.

These improvements in automatic product weighing machines, particularly for food products, are characterised in that the buckets are arranged in two series in two concentric circumferences on a same horizontal general plane; that horizontal radially arranged frames are comprised, each having an intermediate cross-member defining two openings, within each of which a bucket of each of the two bucket series is loosely housed, each bucket having the end of a pair of flexible, resilient, overlying and parallel straps joined at each of two of its sides, the other end of the two pairs of straps being joined to the respective frame; that two weighing means are provided, radially aligned in order to simultaneously weigh every pair of buckets in each of the two bucket series and respectively arranged at the weighing area beneath said two series; that the frames have roller means at their free end, standing on a track sector extending from at least the bucket load area to the bucket weighing area, and on another track sector at least located roughly at a position diametrically opposite the weighing area; that the buckets each have roller means at each of their right and left sides, which means each stand on parallel tracks located at the weighing area, connected to the respective weighing means and causing the buckets to be lifted from their frame; that a control is provided for metering the products to be delivered onto the buckets, consisting of two parallel conveyor means over which laminar means may be arranged, individually governed by respective means for the same to be moved in accordance with the respective surfaces to be covered; and that two conveyor means are provided for the products unloaded from the buckets, arranged in a position diametrically opposite and below the same.

The automatic product weighing machine, particularly for food products, provided with the improvements subject of the invention, provides the following advantages, inter alia: the combinations defining the sets of product units with a pre-set weight and tolerance are more speedily obtained; production of said sets per unit of time is increased; the machine is versatile, since it may have several packagers coupled to it in accordance with the user needs; sets of products with a different weight or different sizes may be simultaneously obtained through different outlets from the weighing machine; and an optimum stabilisation of the full or empty buckets at the weighing area, thereby ensuring an accurate weighing.

The improvements of the invention yield the advantages described hereinbefore, and others that will be easily inferred from the example of an embodiment of an automatic product weighing machine, particularly for food products, provided with the above improvements, described hereinafter to facilitate the understanding of the characteristics set out above, and concurrently revealing several details thereof, a number of drawings being therefore attached which represent, for purely illustrative purposes and not to limit the scope of the invention, a practical embodiment thereof.

DESCRIPTION OF AN EMBODIMENT OF THE INVENTION

With reference to the drawings, the automatic weighing machine fitted with the improvements of the invention comprises a housing (1) (FIGS. 1 and 2) holding the machine parts, with suitable legs (2) to stand on the floor (FIG. 2), which may have conventional height adjustment mechanisms for the machine to be levelled and even conventional fasteners for fixing the same to the floor. It also comprises means (not shown) such as a coventional electric motor or similar conventional motive device driving a support (3) (FIGS. 2, 3, 6 and 7) turning about an upright central shaft (4) on which said support, which is horizontal, is mounted and guided. The support with the two concentric bucket series turns in the direction of the arrow of FIGS. 1 and 3, an arrow in FIGS. 8 to 11 also showing the direction in which the buckets move.

The machine can have conveyor means (5) (FIG. 1) comprising in this embodiment two separate belts conveying the products in spite of coming from another or other machines or a product feed line, each conveyor means being driven by a gearmotor (6). The conveyor means (5) can be of the kind lifting the products to the top of the machine or be arranged otherwise howsoever and may be replaced, as the case may be, with other coventional mechanisms designed for conveying the products to the machine inlet, depending on the plant in which the same is arranged; furthermore, the gearmotors of the conveyor means (5) will be controlled by the machine or machines preceding the same or by the line in which they are arranged and by the weighing machine proper. The products conveyed by the conveyor means (5) are transferred to parallel conveyor means (7) (FIGS. 1 and 12), comprising two separate conveyor belts, each driven by a respective gearmotor, said gearmotor (8) being shown in FIG. 12—the other gearmotor being concealed—, which conveyor means (7) end in two pairs of vertical plates (9) for the products to be better guided as they are delivered onto the buckets flowing below the free end of the conveyor means (7).

The buckets, such as the outer bucket (10) and inner bucket (11), for instance (FIGS. 1, 2, 3 and 6 to 11), are arranged in two bucket series arranged forming two concentric circumferences with respect to the vertical shaft (4), on a same general horizontal plane. The number of buckets in the two series may vary, and 19 buckets are provided per series in this embodiment, yielding 38 buckets in all, increasing the probability of speedily obtaining a weight combination of the products contained in the buckets for the products to be selectively unloaded in accordance with the desired total weight and tolerance. Each of the outer buckets (10) has two mobile right—in the direction of travel—(12) and left (13) walls (FIGS. 8 and 9), which are articulated to respective cross-members joining the other two walls, the two mobile walls being interconnected next to the right wall or side of the bucket (FIG. 9) by means of a connecting rod (14) respectively articulated to each of said two mobile walls, whereas two levers (15) and (16) are articulated on the left side of the bucket, each biased by a spring (17) and (18) that keeps them closed as shown in FIG. 8, in which the respective angle slots in each of the two levers each hold at the end of their shorter side a bar (19) and (20) respectively fixed to the mobile walls (12) and (13), holding them in said closed bucket position; and the lever (16) has a bar (21) bent at an angle joined through its right end in FIG. 8 to the lever (16) through a part separating it therefrom, and with the rest of said bar free and clear of the lever (15).

Figure 1:
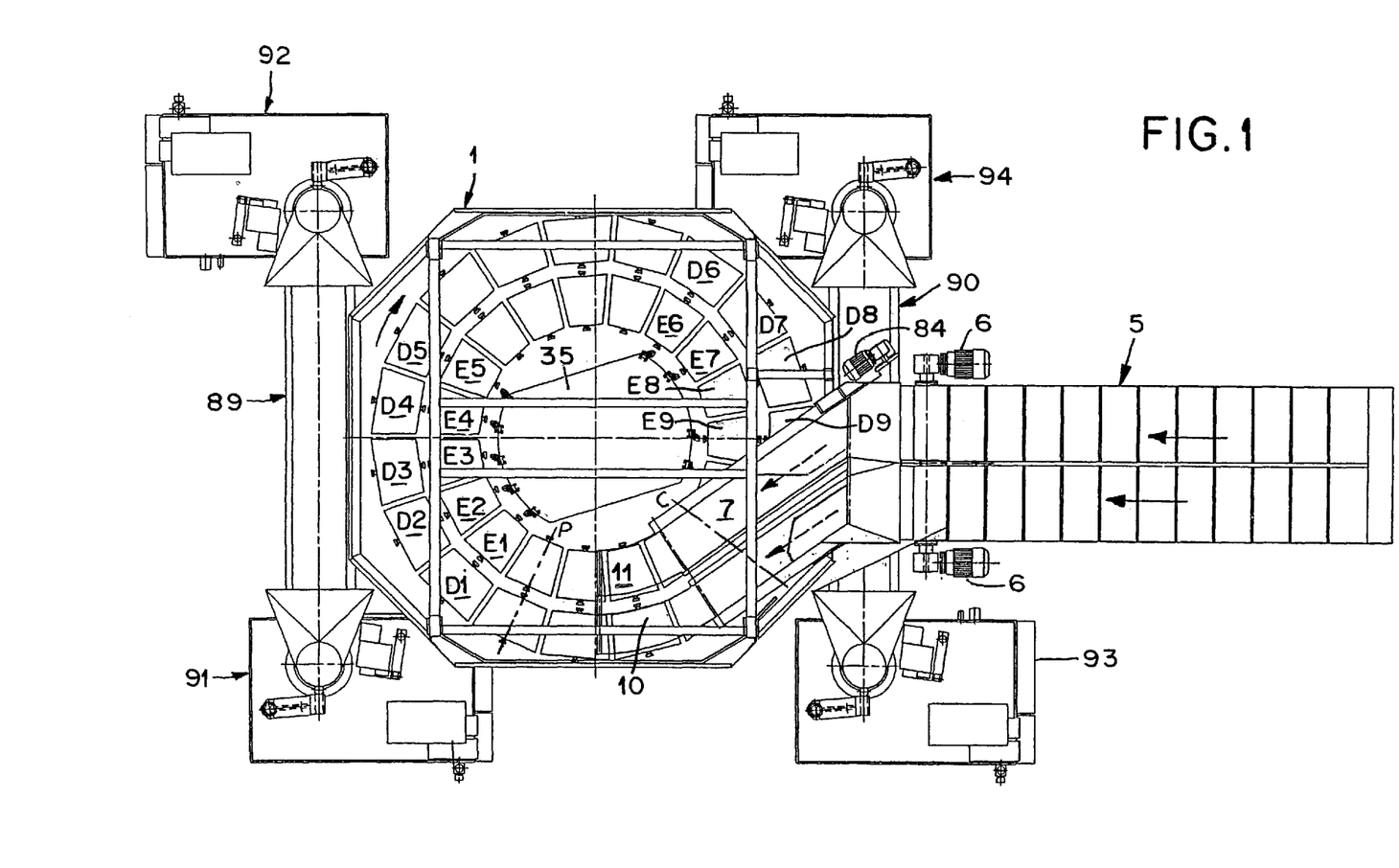
FIG. 1 is a plan view of an automatic product weighing machine.

In order for the bucket to be opened, i.e. in order for both of its mobile walls to be opened and thereby for the product or products therein contained to be unloaded, a varying number of preferably pneumatic cylinders (22), five in this embodiment, are arranged along a potential delivery area of the outer buckets (10), lying at positions (D1), (D2), (D3), (D4) and (D5) shown in FIG. 1. Upon the cylinder (22) being actuated, the lever (23) turns to the position shown in FIG. 8, at which, upon the bucket (10) moving to the left in the direction of the arrow shown in FIG. 8, the free left end of the bar (21) will abut on the wheel at the free end of the lever (23), causing the lever (16) to turn counterclockwise, overcoming the spring (18) bias, and the left finger-like end of the lever (16) will cause the lever (15) to turn clockwise, in turn likewise overcoming the spring (17) bias, thereby for the bars (19) and (20) to slide along the shorter side of their respective slots until they face the respective longer side thereof, at which point the very weight of the products contained in the bucket and the weight of the mobile walls will cause the mobile walls (12) and (13) to swing outwards and the products thereby to be unloaded from the bucket. Opening of the mobile walls on the outer bucket (10) is limited because the bars (19) and (20) take up a position at the end of the longer side of the slots in the respective levers (15) and (16).

Figure 8:
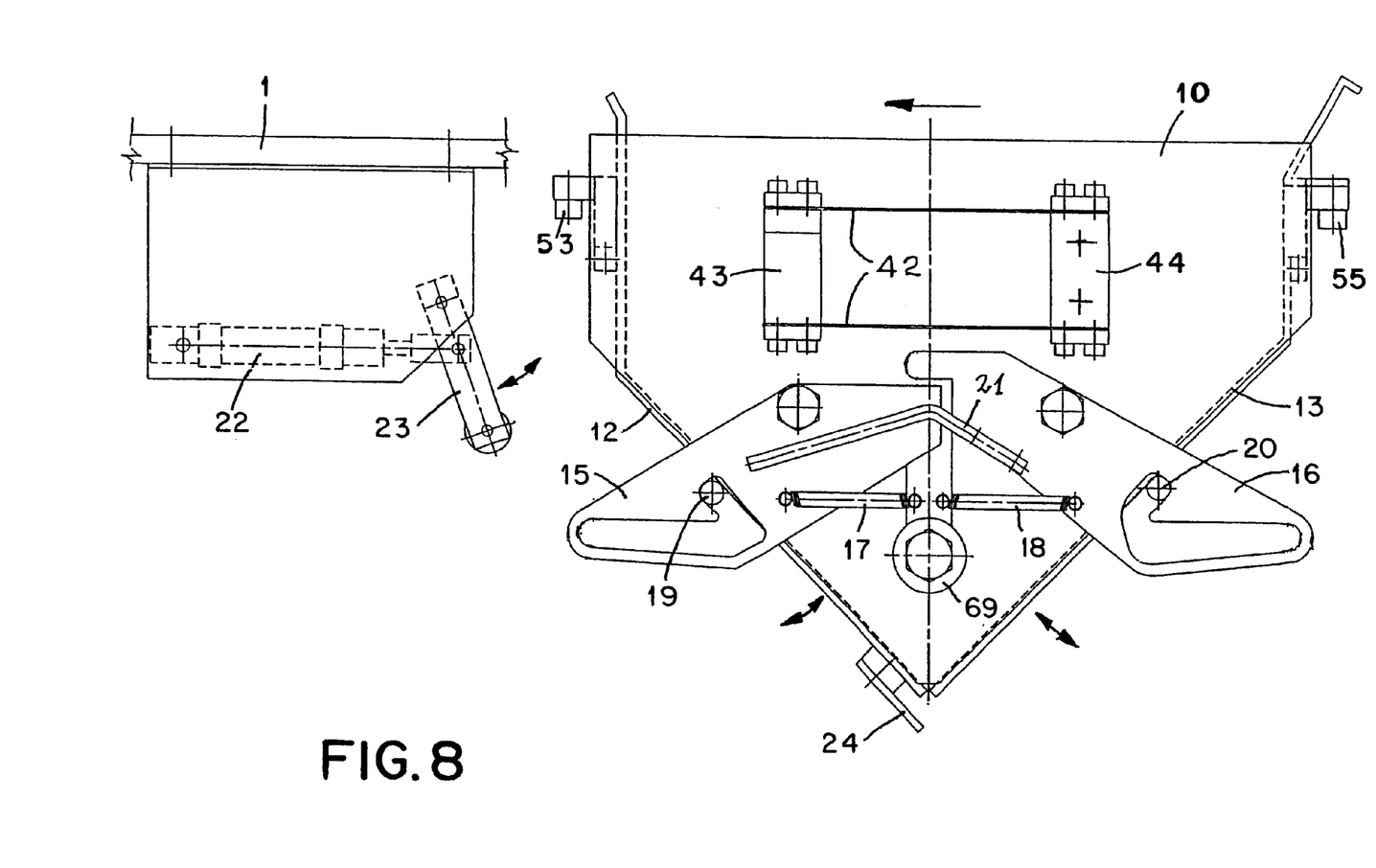
FIG. 8 is a left side elevational view of an outer bucket and driving means for opening same.
Figure 9:
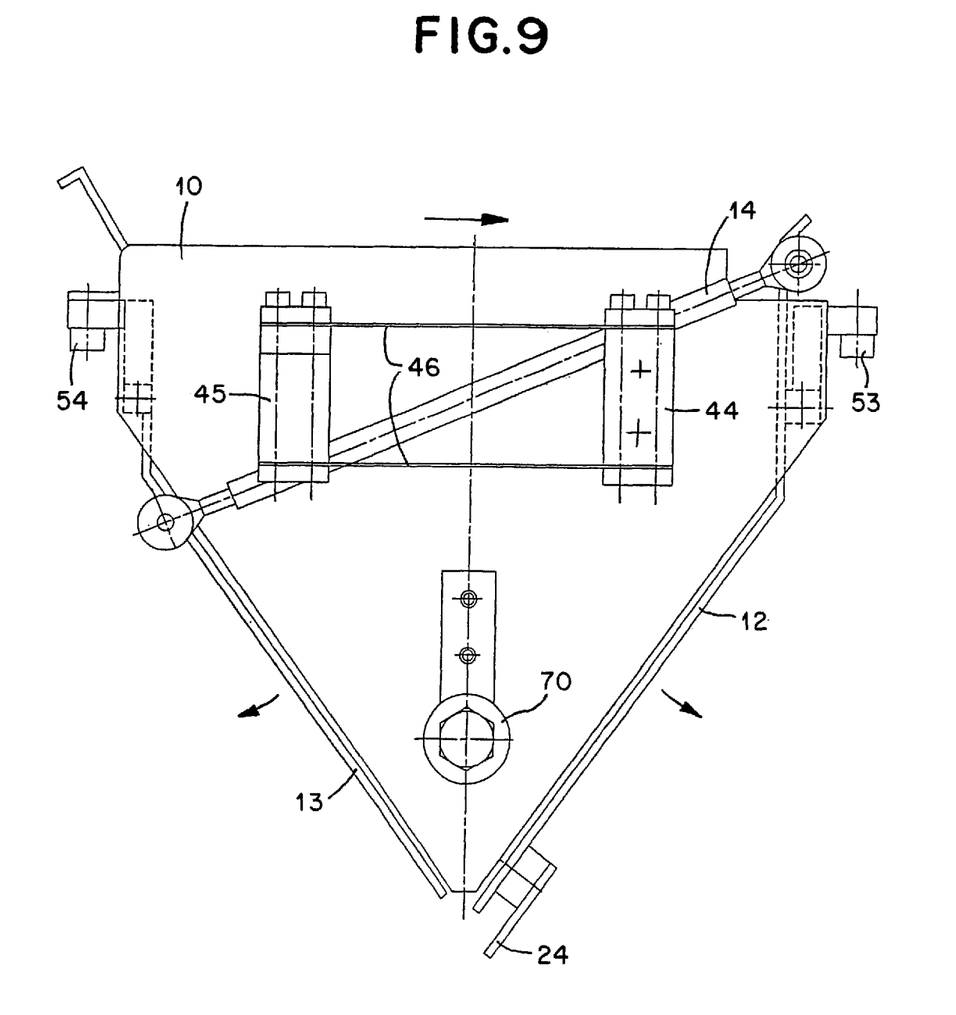
FIG. 9 is an enlarged right side elevational view of an outer bucket.

The lever (23) is driven counterclockwise when the cylinder (22) is actuated, moving its bar to the right until it reaches a position in which the lever wheel no longer acts on the bar (21) when the bucket (10) moves towards the left in FIG. 8. The cylinder (22) is fixed to the housing (1) and the front wall (12) of the bucket has a tab (24) on its bottom edge, projecting downwards and serving to cause the mobile walls of the bucket to be shut, when the bucket abuts, when moving to the left, on a fixed salient from the machine, located at the closing area, the axis (C) of which is shown in FIG. 1, which causes the mobile wall (12) to move in the opposite direction, which latter wall will in turn force the wall (13) to be closed through the connecting rod (14), until the bars (19) and (20) reach the position shown in FIG. 8 where they are held at the end of the shorter side of the respective slot of the levers (15) and (16).

There are other potential unloading areas (D6), (D7), (D8), (D9) and (D10) (the latter is concealed since it lies beneath the conveyor means (7)) with pneumatic cylinders and their respective lever (not shown) arranged facing each such areas, as the cylinder (22) and the lever (23).

Figure 10:
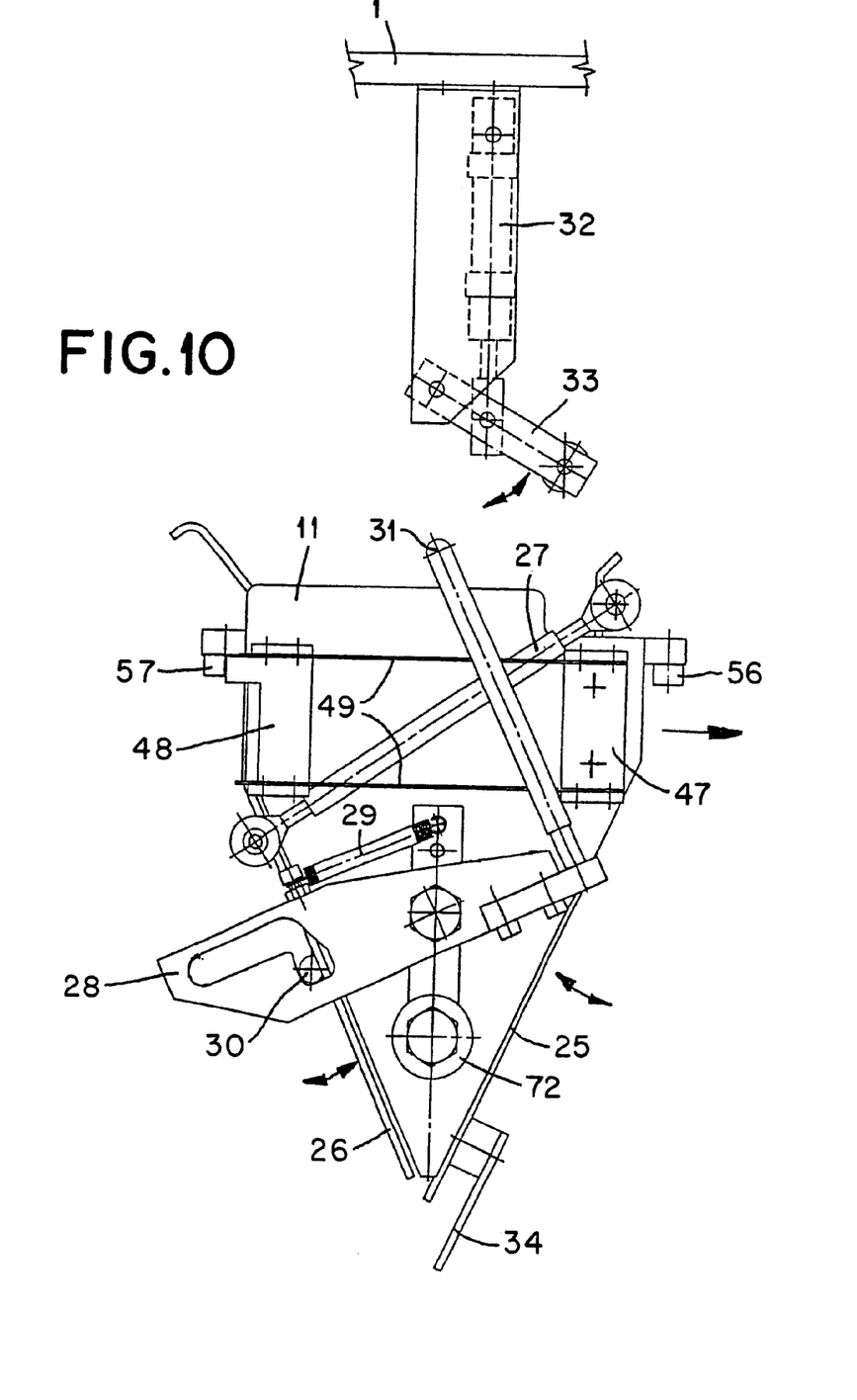
FIG. 10 is a right side elevational view of an inner bucket and means for opening same.

Furthermore, the inner bucket (11) has two mobile walls (25) and (26), the wall (25) lying at the front and the wall (26) at the back with respect to the direction of flow of the two bucket series. Both walls are each articulated to cross-members joining the two walls or right and left sides of the bucket and are interconnected by means of a connecting rod (27) located next to the right side of the bucket and articulated to the walls, as shown in FIG. 10. A lever (28) is articulated on the right of the bucket, biased by a spring (29), and with an angle slot holding a bar (30) at the end of its shorter side, joined to the mobile wall (26) and projecting therefrom in order to be inserted within the slot (FIG. 10).

The lever (28) is fitted with a bar (31) projecting from its side, which may be actuated to cause the bucket to open, and to this end a varying number of means are provided—five in this case (FIG. 1) at the potential delivery positions (E1), (E2), (E3), (E4) and (E5) and at five other potential delivery positions (E6), (E7), (E8), (E9) and (E10) (the latter position is not marked and relates to a bucket that is largely below the conveyor means (7))—causing the buckets to be unloaded, as the case may be, each of which means comprise a pneumatic cylinder (32) with its rod articulated to the lever (33), which is in turn articulated to the housing (1) to which the cylinder is also articulated.

Figure 11:
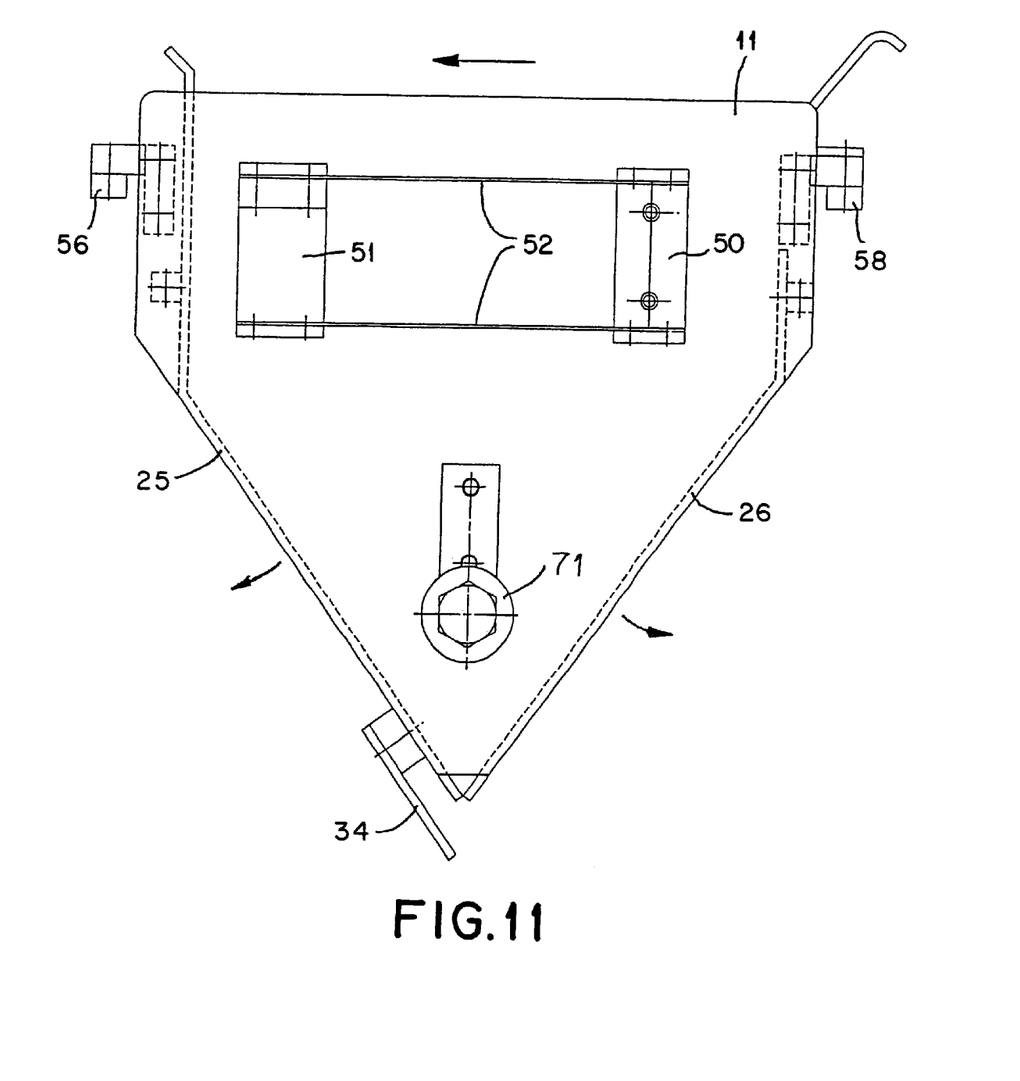
FIG. 11 is an enlarged left side elevation view of an inner bucket.

The free end of the lever (33) has a wheel which can abut on the bar (31) when the cylinder is actuated, thereby for its rod to project and cause said lever to turn counterclockwise, and thus, upon the bucket (11) moving in the direction shown by the arrow (to the right of FIG. 10), it will cause the lever (28) to turn counterclockwise—due to the backward movement of the bar (31)—against the spring (29) bias until the bar (30) takes up a position on the longer side of the angle slot and the weight of the products contained in the bucket and the actual weight of the two mobile walls cause the walls to open and the bucket to unload said products. When the open bucket reaches the closing area (C) (FIG. 1), the tab (34) fixed to and projecting down from the mobile wall (25), abuts on a respective stop, causing it to turn back towards the closed position and the connecting rod (27) also causes the mobile wall (26) to be shut (FIGS. 10 and 11).

The outer (10) and inner (11) buckets can have linings or the like on their inner faces to lessen the noise generated as the products loaded into the same hit such faces, and moreover to lessen the shock.

The opening of the mobile walls of the inner bucket (11) is limited by the respective position of the bar (30) at the end of the longer side of the slot in the lever (28), and when said two walls are closed, the bar (30) takes up a position at the end of the shorter side of said slot and lies in that position as shown in FIG. 10.

Figure 2:
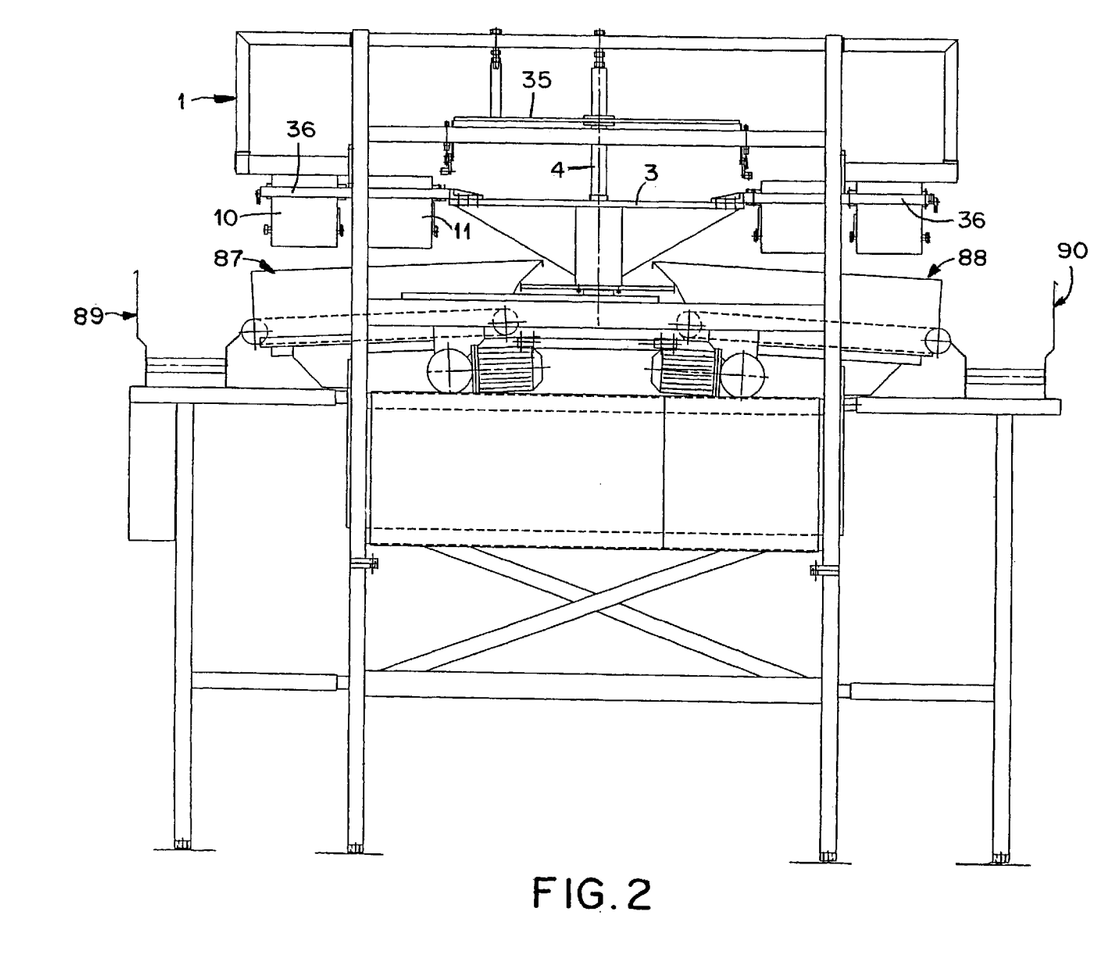
FIG. 2 is an enlarged elevational view of the machine shown in FIG. 1.

FIGS. 1 and 2 show a horizontal plate (35) joined to the housing (1) on which the ten sets comprising the cylinders (32) and their levers (33) are mounted as shown in FIG. 10.

The housing supports for the cylinders (22) and their levers (23) have not been shown for an easier viewing of the drawings.

Figure 3:
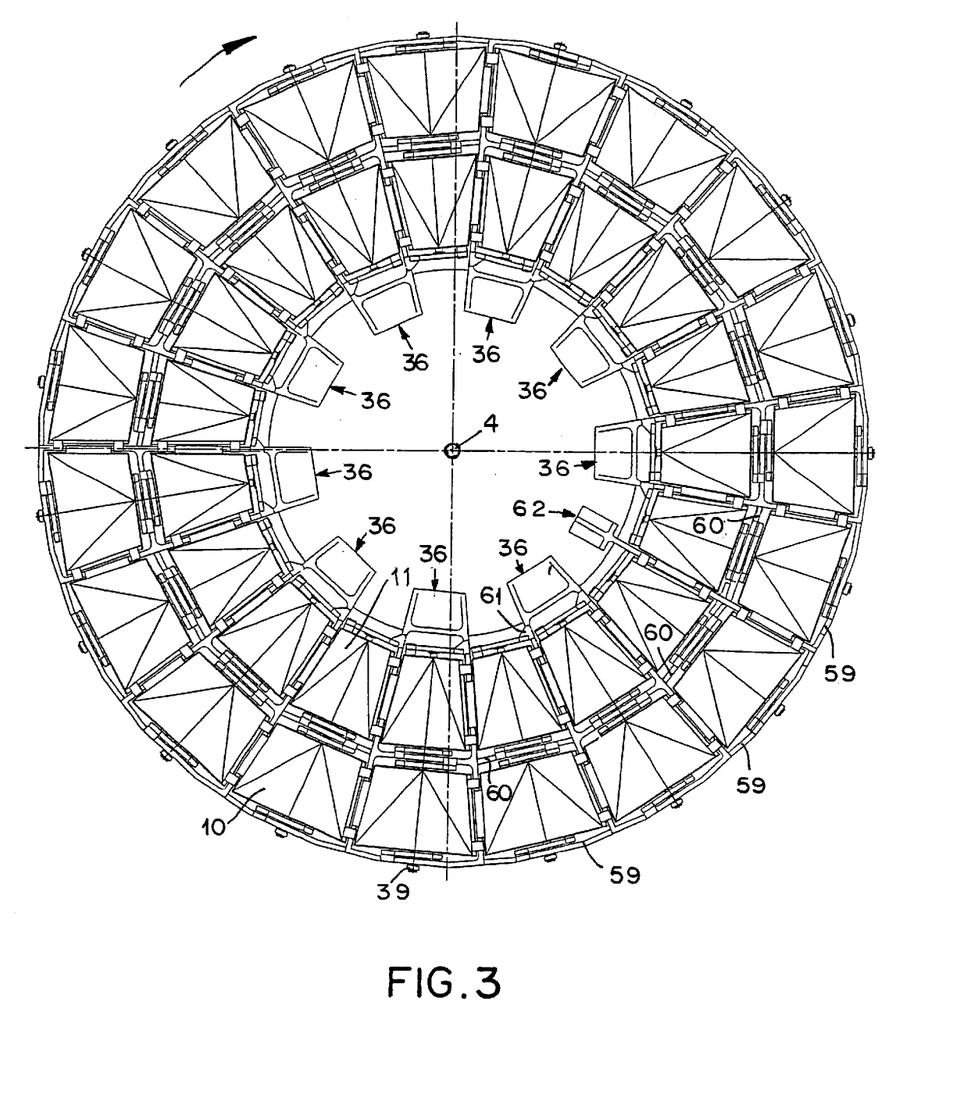
FIG. 3 is an enlarged (or closeup) plan view of the buckets and their frames and respective turning supports.
Figure 4:
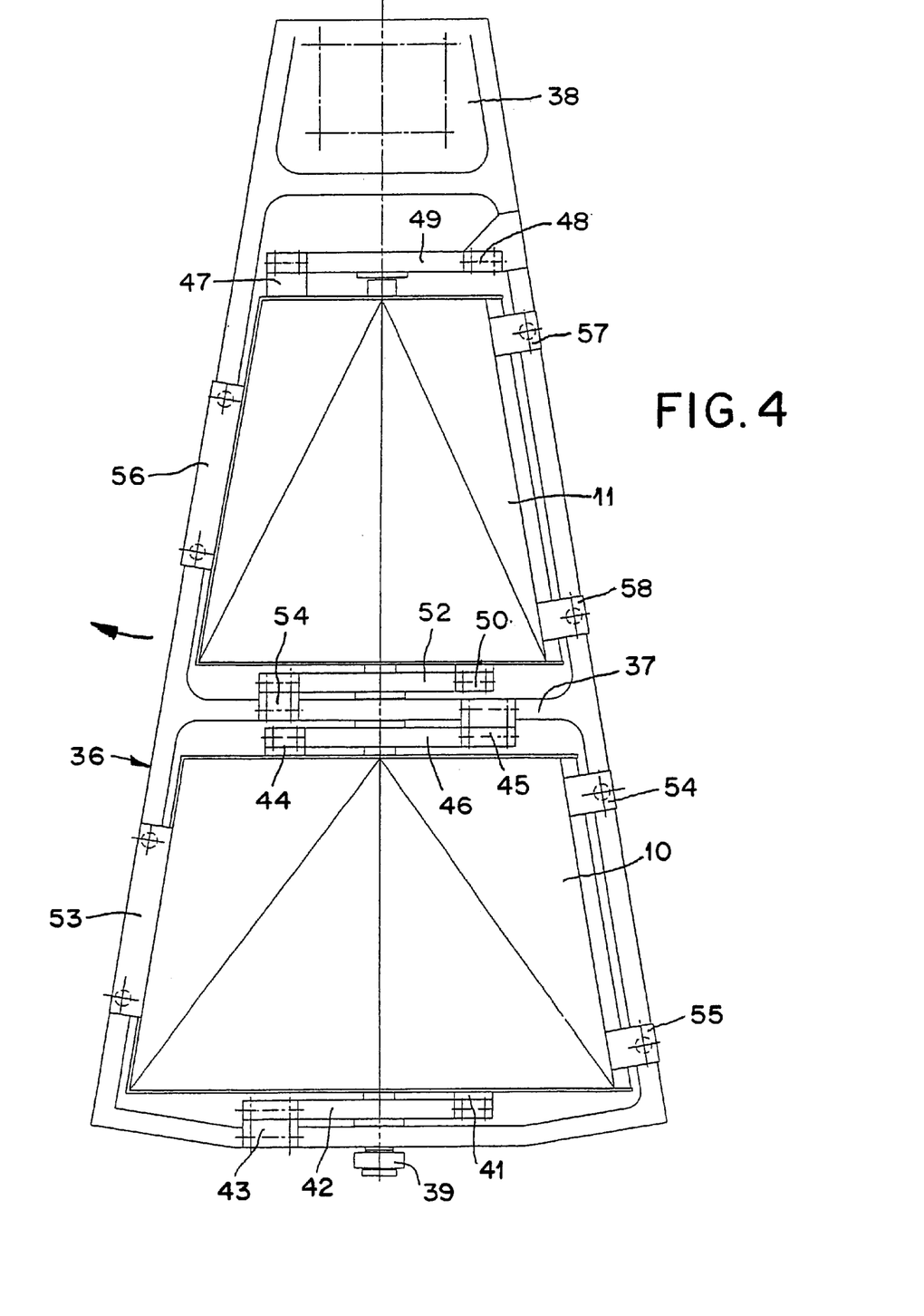
FIG. 4 is an enlarged plan view of a frame for two buckets.
Figure 6:
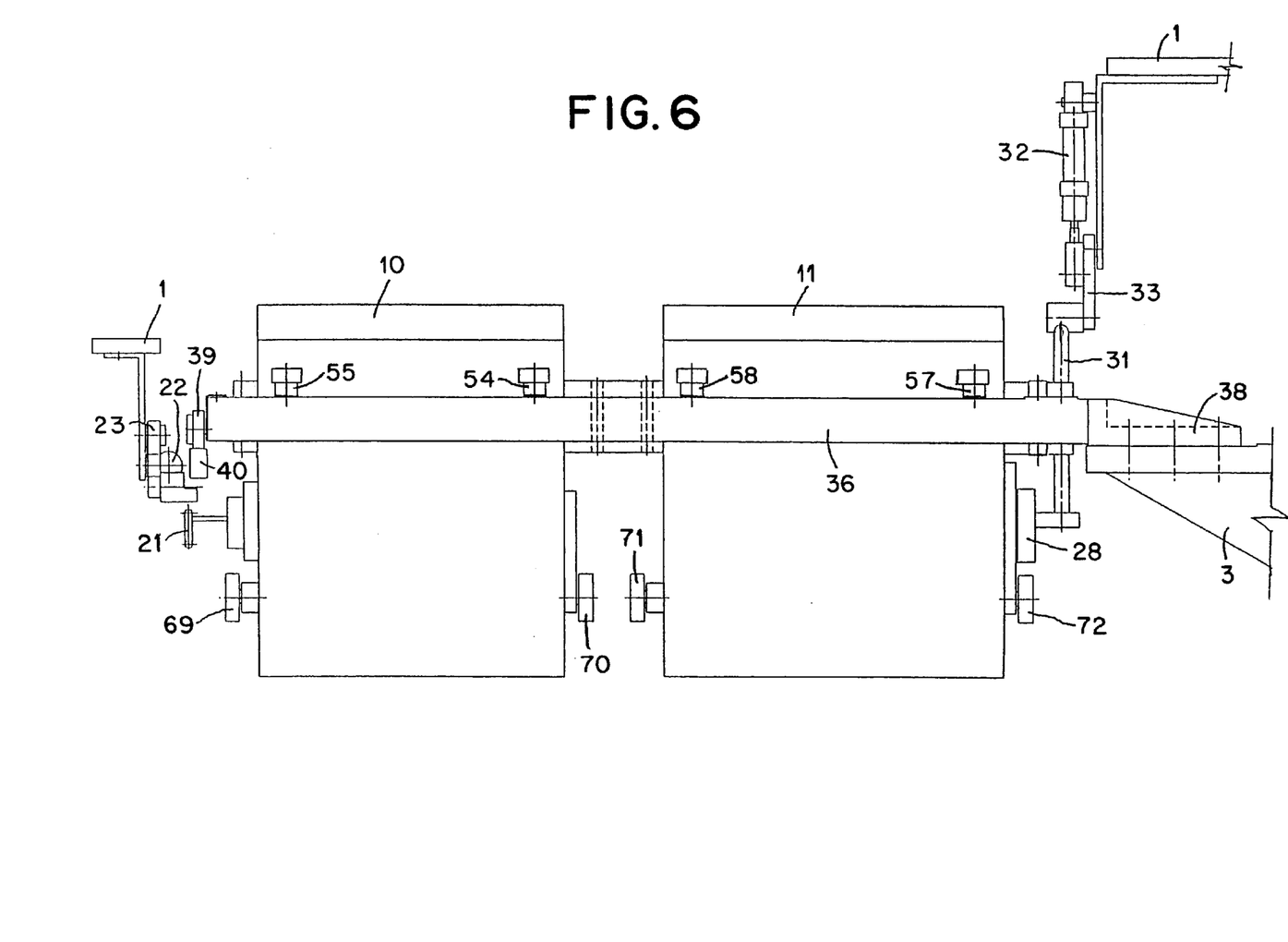
FIG. 6 is a side elevational view taken from the rear of the buckets showing two mounted supports standing on their frame and the driving means for opening same.
Figure 7:
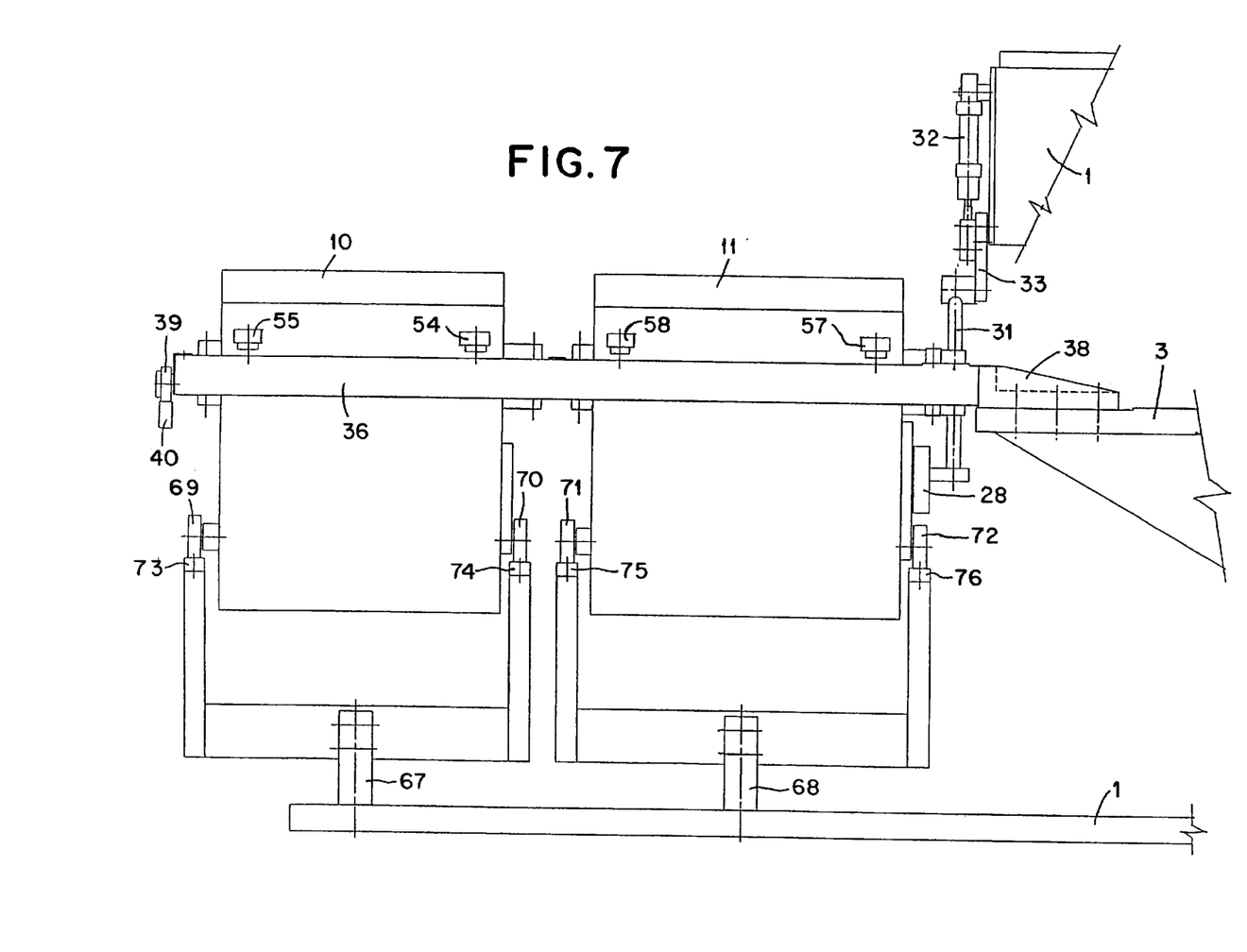
FIG. 7 is another side elevational view taken from the rear of the buckets with their respective frames, arranged over weighing means.

Every pair of buckets, namely an outer (10) and an inner (11) bucket, is mounted on a respective horizontal frame (36) (FIG. 4 in detail with both buckets mounted in the frame; FIGS. 2, 6 and 7 in general; and FIG. 3 shows the mounted frames and buckets). The general trapezium-shaped frame has a middle cross-member (37) delimiting two similarly general trapezium-shaped openings, and its narrower end portion has a plate-like opening (38) with a flat bottom for the same to be supported on and joined to the turning support (3) (FIGS. 2, 3, 6 and 7), the frame being radially arranged as shown in FIGS. 2 and 3. The free end of the frame is provided with a wheel or bearing (39) (FIGS. 3, 4, 6 and 7) or other roller means known in the art to stand on a track sector (40) extending from at least the bucket loading area—whose axis (C) is shown in FIG. 1—to the bucket weighing area—whose axis (P) is shown in said FIG. 1—and on another track sector (40) at least arranged roughly in a position diametrically opposite the weighing area. These track sectors prevent vibrations which might potentially be detrimental to an accurate weighing, and a single circular and continues track may be arranged to obtain a continuous support for the free ends of the frames, if desired.

The outer bucket (10) is provided with a spacer (41) joined to one of its two sides, specifically the left side in the direction of travel of the buckets (FIGS. 4, 8 and 9) at which the two ends of two straps (42) are in turn joined, the other end of which is in turn joined to another spacer (43) lying in a free and overhanging arrangement; said straps are flexible, resilient, overlying and parallel as shown in FIG. 8. On its other opposite side, i.e. its right side, the bucket (10) also has (FIG. 9) an arrangement similar to the preceding one, albeit inverted, i.e. with the spacer (44) joined to the side of the bucket and the spacer (45) in a free and overhanging arrangement, both spacers being joined through the pair of flexible, resilient, overlying and parallel straps (46) as in the left side of the bucket (10). It is noteworthy that the spacers (44) and (45) are spaced from the right side of the bucket sufficiently in order to allow the connecting rod (14) to operatively pass between said spacers and the side.

Similarly, the inner bucket (11) has a spacer (47) on its right side in its direction of travel (FIGS. 4, 10 and 11) joined to the right side of the bucket and a free and overhanging spacer (48), which is linked to the preceding one by a pair of flexible, resilient, overlying and parallel straps (49); the spacers (47) and (48) are thus spaced from the right side sufficiently in order to allow the connecting rod (27) to move between the pair of straps and said side. Moreover, the left side of the inner bucket (11) (FIG. 11) has the spacer (50)

joined to said side and the free and overhanging spacer (51), both spacers being joined through the pair of flexible, resilient, overlying and parallel straps (52).

FIG. 4 closely shows how the buckets (10) and (11) are mounted within the frame (36), both buckets being housed in the two respective frame openings.

The outer bucket (10) is joined to the frame by means of a top horizontal wing-like extension from the spacer (43) on the frame side facing the left side of the bucket, and the spacer (45) is similarly supported on and joined to the frame cross-member (37), the bucket being thus joined to the frame albeit capable of moving slightly up and down, as will be explained hereinafter when details are given of how each pair of buckets is weighed.

In order for the bucket to be supported in a stable manner due to its own weight and, as the case may be, full of the relevant product or products, whilst being carried on the frame, the outer bucket (10) is provided (FIGS. 4 and 6 to 9) with a front transverse support (53) and two transverse supports (54) and (55). Similarly, the inner bucket (11) is provided (FIGS. 4, 6, 7, 10 and 11) with a front transverse support (56) and two rear transverse supports (57) and (58) for the bucket to stand on the frame (36).

In this embodiment, each of the two bucket series has nineteen buckets (FIG. 3) and nine frames are arranged. An outer peripheral cross-member (59) is arranged between every consecutive pair of frames, lying between frames and joined thereto, and a middle cross-member (60) is also provided joined to both frames between which it is arranged and a bracket (61) is fixed to one of the frames, in this case the rear frame in the direction of travel of each pair of frames, the respective inner bucket (11) spacer (48) being supported on and joined to such bracket. The inner bucket (11) spacer (51) and the outer bucket (10) spacer (45) are supported on and joined to the cross-member (60), whereas the spacer (43) is supported on and joined to the cross-member (59).

When there is an odd number of buckets in each series, as in the subject embodiment (in this one, there are nineteen buckets in each series), a shim (62) shall be arranged between two consecutive frames (FIGS. 3 and 5) comprising a radially arranged rectilinear resisting element, provided with an inner blade-like end (63) with a flat lower base to stand on and fixed to the turning support (3) and another T-shaped outer end to be joined to the respective peripheral ends of the two adjacent cross-members (59), as well as two transverse wings (65) to be joined to two cross-members (60), a portion (66) being duly arranged next to the blade (63) to join the spacer (48) of the respective inner bucket (11) adjacent the shim (62) thereto.

Figure 5:
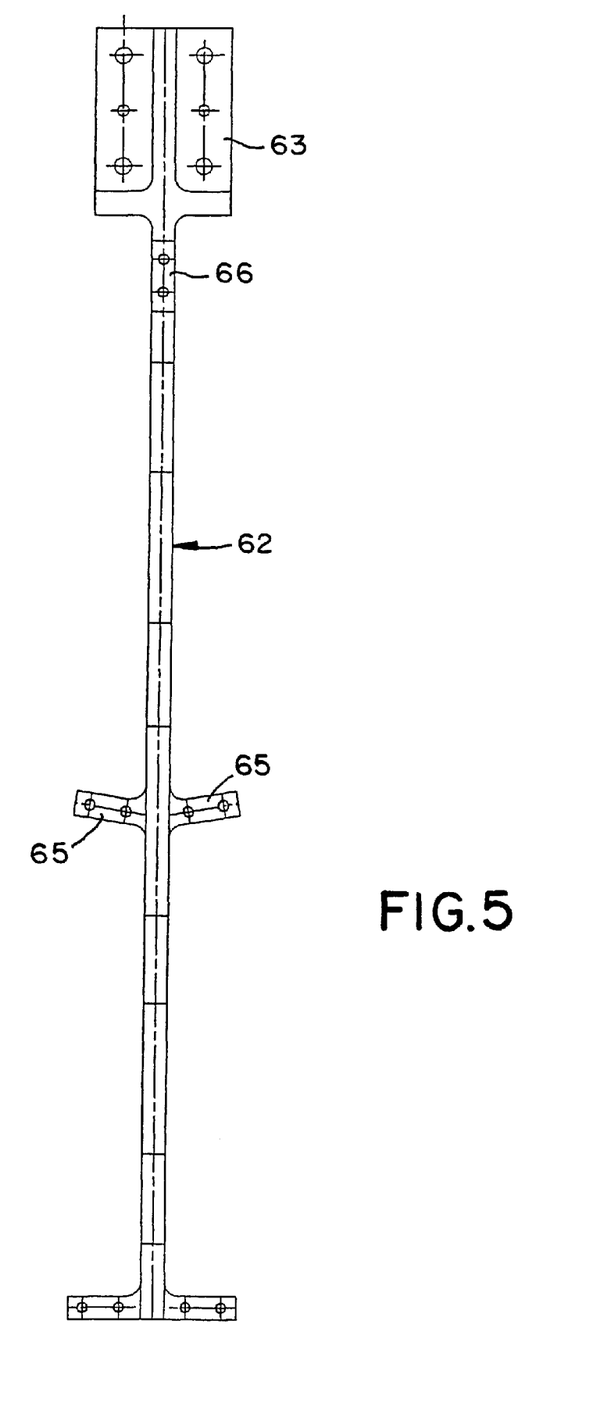
FIG. 5 is a plan view of a shim for supporting four buckets—two on either side of the shim to be mounted on the support between two frames.

If there is an even number of buckets in each series, then the shim (62) need not be arranged.

It is noteworthy that the spacing between the transverse stands (54) and (55) of each outer bucket (10) is greater than the length of the support (53) and that the same is the case of the spacing between the supports (57) and (58) with respect to the support (56) for the inner bucket (11), all of which allows the supports (53) and (56) of the respective buckets (10) and (11) to be arranged between the pairs of supports (54), (55) and (57), (58) of each pair of adjacent buckets, as shown in FIG. 3, allowing a perfect side coupling of said adjacent buckets.

In another embodiment of the weighing machine, said outer and inner bucket supports may be arranged on the other two sides, right and left thereof in the direction of travel, and the pairs of straps (42) and (46) of the buckets (10) and the pairs of straps (49) and (52) of the buckets (11) may be arranged on the other two sides of the respective buckets, i.e. said pairs of straps being arranged supported on and joined to the longer sides of the respective frame (36), i.e. to the front and rear sides in the direction of travel of each frame.

The machine weighing means are located in the area identified with the axis (P) (FIG. 1) and consist in this embodiment of two load or weighing cells (67) and (68) (FIG. 7) mounted in the housing (1), and dampers may be provided for the supports of said load cells. The cells are radially aligned to be able to simultaneously weight each pair of buckets (10) and (11) of each of the two bucket series, to which end both load cells are arranged beneath said two bucket series. Each outer bucket (10) has two wheels or bearings (69) and (70), respectively mounted on the left and right sides in the direction of travel of the bucket (FIGS. 6, 7, 8 and 9), and each of the inner buckets (11) has two wheels or bearings (71) and (72), respectively mounted on the left and right sides in their direction of travel (FIGS. 6, 7, 10 and 11).

Tracks (73) and (74) (FIG. 7) are arranged in the weighing areas joined through a respective double support to the load cell (67), which tracks are parallel and have the bucket (10) lifted from the respective frame (36) and also from the respective shim (62), as the case may be, thereby for the rear supports (54) and (55) and moreover the front support (53) to be separated upwards from the frame, which lifting is permitted by the flexibility of the two pairs of straps linking the bucket (10) and the frame, the bucket being thus accurately weighed—determining its tare if empty—with the product or products contained therein. Two tracks (75) and (76) are similarly arranged standing on the load cell (68), the wheels (71) and (72) of the lower bucket (11) being supported and consequently lifted from the frame (36) and also from the shim (62), as the case may be, the rear supports (57) and (58) and the front support (56) of said bucket being separated from the frame and also from the shim (62), as the case may be. For an easier lifting of the buckets (10) and (11), the tracks (73), (74), (75) and (76) will have a first upward slope up to substantially their maximum horizontal level, and after the lifted buckets overpass the load cells, the tracks will have a downward slope until the front and rear supports of the buckets (10) and (11) abut on the respective frame (36) and the respective shim (62), as the case may be. The tracks shall have a portion of sufficient length before the load cells to stabilise the buckets before being weighed.

Figure 12:
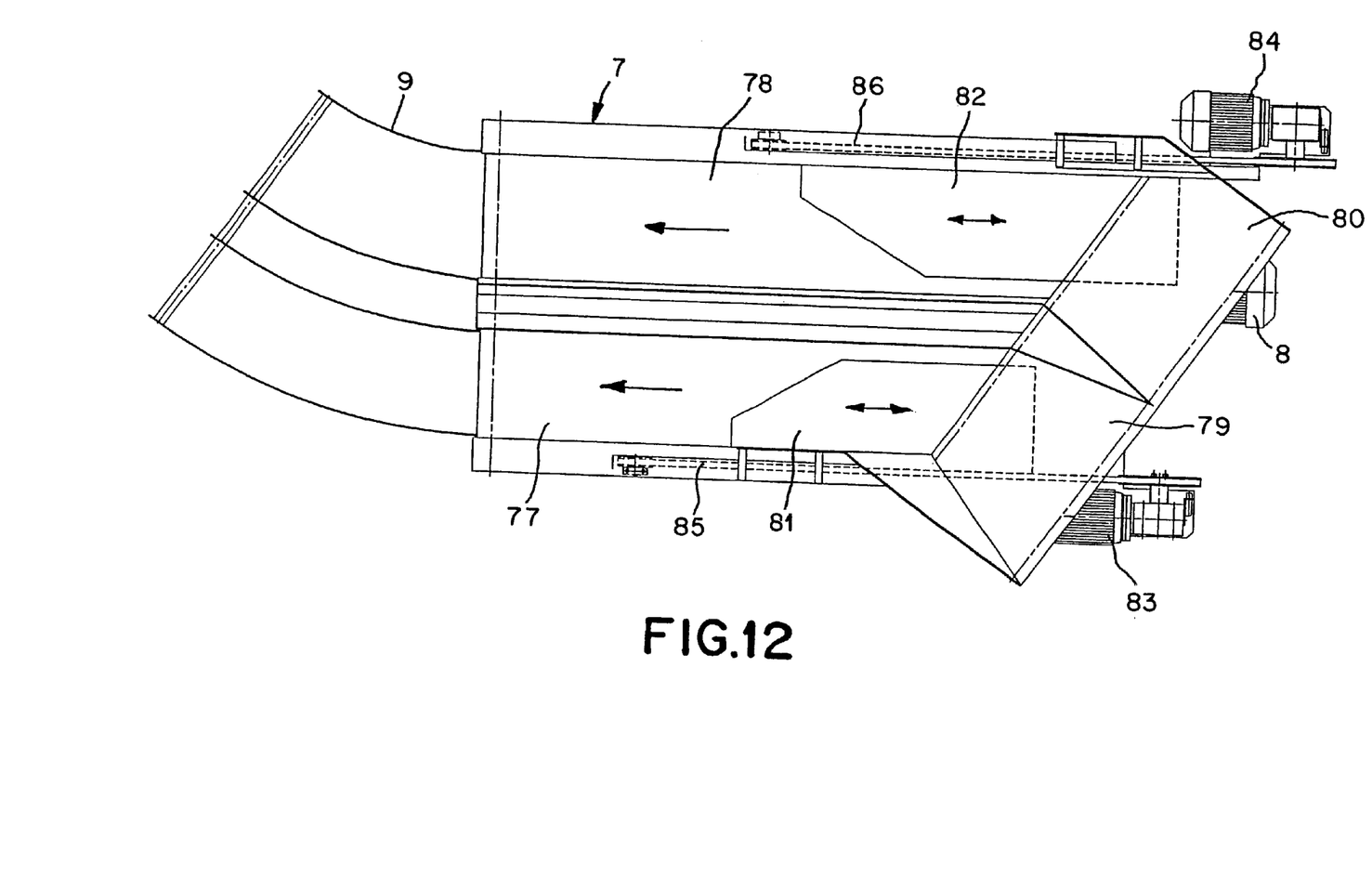
FIG. 12 is a plan view of a conveyor means having a metering control for the products delivered onto the buckets.

The conveyor means (7) (FIGS. 1 and mainly 12) have a control metering the products to be delivered onto the buckets, comprising two separate parallel conveyor belts (77) and (78) driven by a respective gearmotor, such as the gearmotor (8)—the other gearmotor is concealed—of variable speed and starting-stopping in accordance with the weight and the quantity of products supplied at the inlet areas (79) and (80) of the conveyor means (7), coming as appropriate from the conveyor means (5) shown in FIG. 1. Sheets (81) and (82) which may consist of any laminar material known in the art may selectively and respectively overlie the belts (77) and (78), individually governed by respective means permitting their movement in accordance with the respective surface to be covered. The means permitting the respective movement of said two sheets consist of two gearmotors (83) and (84) which, through two transmission means (85) and (86), cause a forward or backward movement of the sheets (81) and (82) joined to the latter to the extent required from time to time, causing the products to be aligned in one or more rows; this is interesting when small products are processed or medium-sized or large products are processed albeit supplied counted, i.e. in a specific product quantity.

Two conveyor means (87) and (88) are located (FIG. 2) beneath the two areas respectively representing positions (D1) to (D5) and (D6) to (D10) where the products contained in the buckets may be unloaded, which consist of side-walls and as appropriate intermediate walls, to delimit the spaces receiving the products unloaded from the buckets, with simple, double, V-shaped, W-shaped or other conventional conveyor means arranged at their bottom; said conveyor means (87) and (88) in turn deliver the weighed products onto respective conveyor means (89) and (90) (FIGS. 1 and 2). Four packaging machines (91), (92), (93) and (94) (FIG. 1), for instance, may at most be arranged on either side of each of the conveyor means (89) and (90), although other machines might clearly be arranged, their number being at all events less than four, depending on the needs from time to time.

When the weighing machine starts operating, the two bucket series make a turning movement in order for all the empty buckets to overpass the respective load cells, in order to find their weight or tare, which shall be recorded by the programming and processing unit, and each time any empty bucket overpasses the respective load cell, it will again be tared in order to achieve a greater accuracy in the weighing process.

The turning speed of the support (3) and therefore of the buckets will be consistent for each operation of the weighing machine with given products, although it may be different for operations with other products, as required.

The above-described driving means—pneumatic cylinders and motors—may be any other conventional means, actuated pneumatically, hydraulically, electrically or by conventional mechanical systems.

The automatic weighing machine fitted with the improvements subject of the invention can have any control system known in the art for controlling and adjusting its various operative phases and systems, connected to an own programming and processing unit or the machine line in which it is arranged, thereby fully or partially automating the assembly, with the ensuing advantages as regards operation and output per unit of time. Said control and adjustment systems will at least be connected to the previous machine or machines with which the subject machine is linked and to the following machine or machines, which are normally packing machines.

What is claimed is:

1. An automatic product weighing machine, having a frame with horizontal supporting means for supporting a plurality of buckets which receive product, and where the buckets are supported on a revolving support shaft disposed about a central axis, and having weighing means so that product contained in each bucket and its tare can be measured, and wherein a programming and processing unit records the tare of each bucket and the true weight of product collected by the buckets so that a combined weight of the products contained in any combination of buckets can be ascertained for unloading as desired, comprising:

a supporting frame for said machine having a plurality of legs;

said plurality of buckets being arranged concentrically about said central axis so that a plurality of concentric buckets form circular series of buckets with each circular series of buckets being adjacently disposed to one another with all of said circular series of buckets being in the same general plane;

a plurality of radially disposed frames having openings extending from an outer periphery to an inner periphery closer to said revolving support shaft and central axis;

a plurality of buckets loosely housed within said openings of said frames;

each of said plurality of buckets having a pair of side walls and front and back movable walls with their tops being open to receive product;

the buckets closer to said inner periphery being smaller than said buckets closer to said outer periphery, and all of said buckets having rollers for engaging with parallel tracks which when measuring weight of product and tare for each bucket, are lifted up slightly from said openings in said frame;

weighing means disposed beneath said buckets and being radially in line with said central axis so that when said plurality of buckets in said concentric circular series are lifted up, weight is simultaneously recorded for said plurality of buckets radially aligned to said central axis and in said concentric circular series;

each of said plurality of buckets having bucket supports for mutual cooperative association with its respective frame so that each bucket can be lifted from an opening in said frame without affecting accurate weight count; and control means for metering product into said concentric circular series of buckets, including first parallel conveyor means disposed above said buckets for feeding said product to said buckets on loading, and second parallel conveyor means disposed below said buckets for receiving product unloaded from said buckets once product weight has been simultaneously recorded for each of said plurality of buckets in said concentric circular series which passes over said weighing means.

2. The machine of claim 1, wherein concentric buckets forming said circular series of buckets comprise two rows.

3. The machine of claim 2, wherein each said radial frames having at least two openings holding a pair of buckets.

4. The machine of claim 1, wherein all buckets are lined to reduce shock effect and noise generated from product loading and/unloading.

5. The machine of claim 1, wherein said legs are provided with leveling means.

6. The machine of claim 1, wherein each radial frame is trapezoidal in shape.

7. The machine of claim 2, wherein the number of buckets in a concentric bucket forming circular series is 19 and the total number of buckets is 38.

8. The machine of claim 2, wherein said plurality of buckets in each concentric bucket forming circular series is even in number.

9. The machine of claim 2, wherein said plurality of buckets in each concentric bucket forming circular series is even in number.

10. The machine of claim 1, wherein said parallel tracks are track sectors arranged along side said buckets in pathways in the vicinity of said weighing means.

11. The machine of claim 10, wherein said track sectors comprise continuous parallel tracts.

12. The machine of claim 2, wherein said first and second parallel conveyor means each comprise two conveyor belts which interface with said two rows for loading and unloading product as desired from said machine.

13. The machine of claim 7, wherein the total number of radially disposed frames employed in said machine is 9, and that cross members connecting opposing elongated sides of said radially disposed frames forming said openings housing loosely therein said buckets.

14. The machine of claim 1, wherein transverse supports secured to said pair of said walls of said buckets have elastic straps extending between said transverse supports for enabling lifting of said buckets due to the flexibility of said elastic straps which link each said bucket to its respective radially disposed frame.

15. The machine of claim 14, wherein a pair of supports provided on both of said movable walls seat on said radial frame to hang each said bucket loosely therefrom for enabling the lifting of said buckets at said weighing means location of said machine.

16. The machine of claim 1, wherein said front and back movable walls form together with said pair of side walls a hopper-like bucket structure with said movable walls conveying generally to a point at its bottom area.

17. The machine of claim 16, wherein one of said sides of each bucket having various mechanical components including spring-loaded links which upon activation opens said movable walls to discharge any said product contained in said bucket.

18. The machine of claim 1, wherein said radial frames are secured at said inner peripheries to a revolving supporting member connected to said revolving support shaft, and said radial frames holding said buckets in said circular series of buckets sweep 360° with each revolution of said support shaft to form each cycle of operation from loading to weighing to unloading.

* * * * *